US012808684B2

(12) United States Patent
Kim et al.

(10) Patent No.: US 12,808,684 B2
(45) Date of Patent: Nov. 24, 2026

(54) APPARATUS FOR CONTROLLING VEHICLE AND METHOD THEREOF

(71) Applicants: Hyundai Motor Company, Seoul (KR); Kia Corporation, Seoul (KR)

(72) Inventors: Chi Hwan Kim, Hwaseong-Si (KR); Hae Young Kwon, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 50 days.

(21) Appl. No.: 18/948,909

(22) Filed: Nov. 15, 2024

(65) Prior Publication Data

US 2025/0347530 A1 Nov. 13, 2025

(30) Foreign Application Priority Data

May 8, 2024 (KR) ........................ 10-2024-0060625

(51) Int. Cl.
*G01C 21/00* (2006.01)
*G06T 7/70* (2017.01)
*G06V 20/56* (2022.01)

(52) U.S. Cl.
CPC ........ *G01C 21/383* (2020.08); *G01C 21/3811* (2020.08); *G01C 21/3837* (2020.08); *G06T 7/70* (2017.01); *G06V 20/56* (2022.01); *G06T 2207/10028* (2013.01); *G06T 2207/30252* (2013.01)

(58) Field of Classification Search
CPC .............. G01C 21/383; G01C 21/3811; G01C 21/3837; G06T 7/70
See application file for complete search history.

(56) References Cited

U.S. PATENT DOCUMENTS

| | | | | |
|---|---|---|---|---|
| 2012/0197521 | A1* | 8/2012 | Miyajima | G01C 21/3602 701/411 |
| 2015/0123995 | A1* | 5/2015 | Zavodny | G06T 11/60 345/630 |
| 2020/0217666 | A1* | 7/2020 | Zhang | G05D 1/242 |
| 2022/0011125 | A1* | 1/2022 | Ge | G08G 1/096883 |
| 2024/0142239 | A1* | 5/2024 | Zhong | G06T 7/20 |

FOREIGN PATENT DOCUMENTS

| | | | | | |
|---|---|---|---|---|---|
| CN | 109707205 | A | * | 5/2019 | |
| CN | 110231040 | B | * | 11/2022 | G01C 21/3415 |
| CN | 116957360 | A | * | 10/2023 | G06Q 10/0637 |
| DE | 102021117253 | A1 | * | 1/2023 | G01C 21/3848 |
| KR | 102521280 | B1 | * | 4/2023 | G05D 1/246 |

* cited by examiner

*Primary Examiner* — Scott A Browne
*Assistant Examiner* — Jason Nguyen
(74) *Attorney, Agent, or Firm* — Banner & Witcoff, Ltd.

(57) ABSTRACT

An apparatus, including a camera, a processor, and a memory, is configured to identify that a vehicle enters a point in an indoor environment from a point in an external environment, obtain a point cloud for at least one object identified using the camera based on the vehicle entering the point in the indoor environment, generate an indoor environment map representing at least a portion of the indoor environment along a movement path of the vehicle in the indoor environment by using the point cloud, and determine the point in the indoor environment as a start point of the indoor environment map by mapping the point of the external environment and the point of the indoor environment using an external environment map representing the external environment.

20 Claims, 8 Drawing Sheets

APPARATUS FOR CONTROLLING VEHICLE AND METHOD THEREOF

CROSS-REFERENCE TO RELATED APPLICATION

This application claims the benefit of priority to Korean Patent Application No. 10-2024-0060625, filed in the Korean Intellectual Property Office on May 8, 2024, the entire contents of which are incorporated herein by reference.

TECHNICAL FIELD

The present disclosure relates to an apparatus for controlling a vehicle and a method thereof, and more specifically, to a technology for generating a map and controlling the vehicle based on the map.

BACKGROUND

A scheme of recognizing a location of a moving object, such as a vehicle, and creating a map of the surrounding environment is called simultaneous localization and mapping (SLAM). The location of the vehicle may be estimated using a sensor to create a map of the surrounding environment via SLAM. A moving object, such as a vehicle and/or apparatus thereon, may correct the estimated vehicle location based on loop closure (e.g., loop closure detection). If a moving object such as a vehicle acquires a two-dimensional image via a camera, there is a need to study a scheme of correcting the estimated location of a vehicle based on loop closure detection.

SUMMARY

The following summary presents a simplified summary of certain features. The summary is not an extensive overview and is not intended to identify key or critical elements.

Systems, apparatuses, and methods are described for controlling a vehicle. An apparatus of a vehicle may comprising: a camera; one or more processors; and a memory storing instructions that, when executed by the one or more processors, are configured to cause the apparatus to: identify that the vehicle moves from a first point in an external environment to a first point in an indoor environment; based on the vehicle moving to the first point in the indoor environment, obtain a point cloud for at least one object identified in an image acquired using the camera; generate, based on the point cloud, an indoor environment map representing at least a portion of the indoor environment along a movement path of the vehicle; map, based on an external environment map representing the external environment, the first point in the external environment to the first point in the indoor environment; determine, based on the map of the first point in the external environment to the first point in the indoor environment, the first point in the indoor environment as a start point of the indoor environment map; and control, based on the generated indoor environment map, operation of the vehicle.

Also, or alternatively, a method (e.g., for controlling a vehicle and/or performed by the vehicle and/or an apparatus of the vehicle) may comprise identifying that the vehicle moves from a first point in an external environment to a first point in an indoor environment; based on the vehicle moving to the first point in the indoor environment, obtaining a point cloud for at least one object identified in an image acquired using a camera; generating, based on the point cloud, an indoor environment map representing at least a portion of the indoor environment along a movement path of the vehicle mapping, based on an external environment map representing the external environment, the first point in the external environment to the first point in the indoor environment; determining, based on the mapping of the first point in the external environment to the first point in the indoor environment, the first point in the indoor environment as a start point of the indoor environment map; and controlling, based on the generated indoor environment map, operation of the vehicle.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
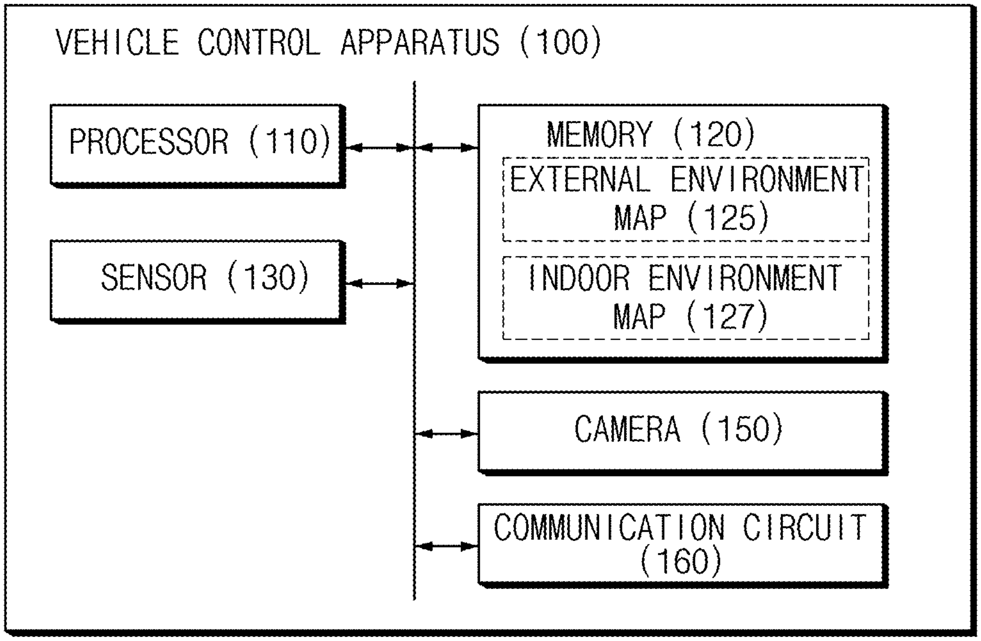
FIG. 1 is a block diagram illustrating an example of a vehicle control apparatus according to an example of the present disclosure.

Hereinafter, some examples of the present disclosure will be described in detail with reference to the exemplary drawings. In adding the reference numerals to the components of each drawing, it should be noted that the identical or equivalent component is specified by the identical numeral even if they are displayed on other drawings. Further, in describing the example of the present disclosure, a detailed description of the related known configuration or function will be omitted if it is determined that it interferes with the understanding of the example of the present disclosure.

Also, or alternatively, terms, such as first, second, A, B, (a), (b) or the like may be used herein if describing components of the present disclosure. The terms are provided only to distinguish the elements from other elements, and the essences, sequences, orders, and numbers of the elements are not limited by the terms. Also, or alternatively, unless defined otherwise, all terms used herein, including technical or scientific terms, have the same meanings as those generally understood by those skilled in the art to which the present disclosure pertains. The terms defined in the generally used dictionaries should be construed as having the meanings that coincide with the meanings of the contexts of the related technologies, and should not be construed as ideal or excessively formal meanings unless clearly defined in the specification of the present disclosure.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. According to an example, the module may be implemented in a form of an application-specific integrated circuit (ASIC). According to various examples, operations performed by the module, the program, or another component may be carried out sequentially, in parallel, or repeatedly, or one or more of the operations may be executed in a different order or omitted, or one or more other operations may be added.

Various examples as set forth herein may be implemented as software (e.g., program) including one or more instructions that are stored in a storage medium (e.g., internal memory or external memory) that is readable by a machine (e.g., a computing device, such as an apparatus 100 for controlling a vehicle). For example, one or more processors (e.g., a processor 110) of the machine (e.g., the apparatus 100 for controlling a vehicle) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" simply means that the storage medium is a tangible device, and does not include a signal (e.g., an electromagnetic wave) per se. "Non-transitory" does not differentiate between data stored semi-permanently in the storage medium and data stored temporarily in the storage medium.

Hereinafter, examples of the present disclosure will be described in detail with reference to FIGS. 1 to 7.

FIG. 1 is a block diagram illustrating an example of a vehicle control apparatus according to an example of the present disclosure.

Referring to FIG. 1, a vehicle control apparatus 100 according to an example of the present disclosure may be implemented inside and/or outside a vehicle. Some of the components included in the vehicle control apparatus 100 may be implemented inside and/or outside the vehicle. The vehicle control apparatus 100 may be formed integrally with internal control devices of the vehicle, and/or may be implemented as a separate device connected to/in communication with the control devices of the vehicle (e.g., via a separate connection device). For example, the vehicle control apparatus 100 may further include components not shown in FIG. 1.

The vehicle control apparatus 100 according to an example may include at least one of the processor 110, a memory 120, a sensor 130, a camera 150, and/or a communication circuit 160. The processor 110, the memory 120, the sensor 130, the camera 150, and the communication circuit 160 may be electrically and/or operably coupled to each other via electronic components including a communication bus. In an example, the camera 150 may be part of and/or included in the sensor 130 (e.g., camera, blind spot monitoring sensor, line departure warning sensor, parking sensor, light sensor, rain sensor, traction control sensor, anti-lock braking system sensor, tire pressure monitoring sensor, seatbelt sensor, airbag sensor, fuel sensor, emission sensor, throttle position sensor, etc.). Hereinafter, hardware being operably coupled may mean that a direct connection or an indirect connection between the hardware is established wired or wirelessly, such that second hardware is controlled by first hardware among the hardware. Although shown based on different blocks, the disclosure is not limited thereto, and some of the hardware in FIG. 1 (e.g., at least a portion of the processor 110, the memory 120, and the communication circuit 160) may be included in a single integrated circuit such as a system on chip (SoC).

The processor 110 of the vehicle control apparatus 100 according to an example may include a hardware component for processing data based on one or more instructions. For example, hardware components for processing data may include an arithmetic and logic unit (ALU), a floating point unit (FPU), a field programmable gate array (FPGA), a central processing unit (CPU), a micro controller unit (MCU), and/or an application processor (AP). The number of processors 110 may be one or more. For example, the processor 110 may have the structure of a multi-core processor including dual cores, quad cores, hexa cores, or octa cores.

The memory 120 of the vehicle control apparatus 100 according to an example may include a hardware component for storing data and/or instructions input and/or output to the processor 110. For example, the memory 120 may include a volatile memory such as a random-access memory (RAM) and/or a non-volatile memory such as a read-only memory (ROM). For example, the non-volatile memory may include at least one of a programmable ROM (PROM), an erasable PROM (EPROM), an electrically erasable PROM (EEPROM), a flash memory, a hard disk, compact disk, and an embedded multi-media card (eMMC). The processor 110 and/or the memory 120 may be associated with a fuel cell system for controlling a fuel cell and/or managing temperature.

The sensor 130 of the vehicle control apparatus 100 according to an example may generate electrical information to be processed by the processor 110 and/or the memory 120 of the vehicle control apparatus 100 based on non-electronic information related to the vehicle control apparatus 100.

In an example, the sensor 130 may include one or more sensors. For example, the sensor 130 may be attached to different locations on the vehicle. The sensor 130 may face (e.g., be configured to sense or receive signal/information from) one or more different directions. For example, the sensor 130 may be attached to the front, sides, rear, and/or roof of the vehicle to face in directions such as forward-facing, rear-facing, side-facing, and the like. However, the disclosure is not limited thereto.

In an example, the sensor 130 may include an image sensor such as a camera (e.g., a high dynamic range camera). The sensor 130 may include one or more non-visual sensors. For example, the sensor 130 may include a radar, a light detection and ranging (LiDAR), and/or an ultrasonic sensor in addition to, or alternative to, an image sensor.

In an example, the sensor 130 may include a posture sensor (e.g., a yaw sensor, a roll sensor, and/or a pitch sensor), a collision sensor, a wheel sensor, a speed sensor, an inclination sensor, a weight sensor, a heading sensor, a gyro sensor, an acceleration sensor, an inertial measurement unit (IMU), a position module, a vehicle forward/reverse sensor, a battery sensor, a fuel sensor, a tire sensor, a steering sensor by steering wheel rotation, a vehicle internal temperature sensor, a vehicle internal humidity sensor, a ultrasonic sensor, an illuminance sensor, an accelerator pedal position sensor, and/or a brake pedal position sensor. For example, an IMU sensor may comprise a device that may measure and/or report a body's specific force, angular rate, and/or magnetic field, using a combination of accelerometers, gyroscopes, and/or magnetometers. The IMU sensor may track an object's movement and orientation in 3D space, providing data on acceleration, rotation, and sometimes direction. IMUs may be useful in applications requiring precise motion tracking and stability, such as in smartphones, drones, virtual reality systems, and/or autonomous vehicles, etc. By integrating this motion data, IMUs may enable devices to navigate, stabilize, and interact with their environment more effectively.

For example, the vehicle control apparatus 100 may obtain, via the sensor 130, vehicle posture information, vehicle collision information, vehicle direction information, vehicle location information (e.g., global positioning system (GPS) information), vehicle angle information, vehicle speed information, vehicle acceleration information, vehicle tilt information, vehicle forward/reverse information, battery information, fuel information, tire information, vehicle lamp information, vehicle internal temperature information, vehicle internal humidity information, and sensing data on steering wheel rotation angle, vehicle external illumination, pressure applied to an accelerator pedal, and/or pressure applied to a brake pedal.

The vehicle control apparatus 100 according to an example may control notification systems including warning systems for notifying the driver of driving events such as approaching a destination or potential collision. For example, the vehicle control apparatus 100 may control the sensor 130 of the vehicle. For example, the vehicle control apparatus 100 may modify the orientation of the sensor 130. The vehicle control apparatus 100 may change the output resolution and/or format type of the sensor 130. The vehicle control apparatus 100 may change (e.g., increase or decrease) the capture rate. The vehicle control apparatus 100 may adjust the dynamic range of the sensor 130. The vehicle control apparatus 100 may control (e.g., turn on or turn off) the operation of the sensors 130 individually or collectively.

The vehicle control apparatus 100 according to an example may perform deep learning analysis on sensor data received from the sensor 130. The vehicle control apparatus 100 may be coupled via an input/output interface to the memory 120 configured to provide a process with instructions that cause to determine deep learning results used to operate the vehicle at least partially autonomously. For example, the vehicle control apparatus 100 may process commands for vehicle control output from the processor 110. In order to control various modules of the vehicle, the vehicle control apparatus 100 may translate the outputs of the processor 110 into commands for controlling the modules of the vehicle. One or more features and/or operations described herein may be used to control autonomous driving of the vehicle. For example, the indoor environment map and/or the start point of the indoor environment map may be used for autonomous driving control of the vehicle.

An automation level of an autonomous driving vehicle may be classified as follows, according to the American Society of Automotive Engineers (SAE). At autonomous driving level 0, the SAE classification standard may correspond to "no automation," in which an autonomous driving system is temporarily involved in emergency situations (e.g., automatic emergency braking) and/or provides warnings only (e.g., blind spot warning, lane departure warning, etc.), and a driver is expected to operate the vehicle. At autonomous driving level 1, the SAE classification standard may correspond to "driver assistance," in which the system performs some driving functions (e.g., steering, acceleration, brake, lane centering, adaptive cruise control, etc.) while the driver operates the vehicle in a normal operation section, and the driver is expected to determine an operation state and/or timing of the system, perform other driving functions, and cope with (e.g., resolve) emergency situations. At autonomous driving level 2, the SAE classification standard may correspond to "partial automation," in which the system performs steering, acceleration, and/or braking under the supervision of the driver, and the driver is expected to determine an operation state and/or timing of the system, perform other driving functions, and cope with (e.g., resolve) emergency situations. At autonomous driving level 3, the SAE classification standard may correspond to "conditional automation," in which the system drives the vehicle (e.g., performs driving functions such as steering, acceleration, and/or braking) under limited conditions but transfer driving control to the driver when the required conditions are not met, and the driver is expected to determine an operation state and/or timing of the system, and take over control in emergency situations but do not otherwise operate the vehicle (e.g., steer, accelerate, and/or brake). At autonomous driving level 4, the SAE classification standard may correspond to "high automation," in which the system performs all driving functions, and the driver is expected to take control of the vehicle only in emergency situations. At autonomous driving level 5, the SAE classification standard may correspond to "full automation," in which the system performs full driving functions without any aid from the driver including in emergency situations, and the driver is not expected to perform any driving functions other than determining the operating state of the system. Although the present disclosure may apply the SAE classification standard for autonomous driving classification, other classification methods and/or algorithms may be used in one or more configurations described herein. One or more features associated with autonomous driving control may be activated based on configured autonomous driving control setting(s) (e.g., based on at least one of: an autonomous driving classification, a selection of an autonomous driving level for a vehicle, etc.).

The vehicle control apparatus 100, according to an example, may use the sensor 130 to obtain the sensor information about the location of the vehicle, the movement path of the vehicle, the posture of the vehicle, and/or at least one object located around the vehicle.

For example, after the vehicle enters a point in the indoor environment (e.g., based on the vehicle entering the point in the indoor environment), the vehicle control apparatus 100 may use the sensor 130 to identify the sensor information about the location of the vehicle in the indoor environment, the movement path of the vehicle, and/or the posture of the vehicle.

For example, the vehicle control apparatus 100 may identify, via the camera 150, at least one object according to the location of the vehicle, the movement path of the vehicle, and/or the posture of the vehicle, based on the sensor information obtained by using the sensor 130.

For example, the vehicle control apparatus 100 may obtain a point cloud for at least one object. For example, the vehicle control apparatus 100 may obtain the point cloud based on the execution of a point cloud information generator. The vehicle control apparatus 100 may perform feature detection or simultaneous localization and mapping (SLAM) on an image obtained via the camera based on the execution of the point cloud information generator. The vehicle control apparatus 100 may use the point cloud to generate an indoor environment map representing at least a portion of the indoor environment along the movement path of the vehicle in the indoor environment. For example, the indoor environment may include an indoor parking lot for parking a vehicle.

The camera 150 of the vehicle control apparatus 100, according to an example, may include one or more optical sensors (e.g., a charged coupled device (CCD) sensor or a complementary metal oxide semiconductor (CMOS) sensor) that generate an electrical signal representing light input (e.g., the color and/or brightness of light). A plurality of optical sensors included in the camera 150 may be arranged in the form of a two-dimensional array. The camera 150 may acquire electrical signals from each of the plurality of optical sensors substantially simultaneously and generate two-dimensional frame data corresponding to light reaching the optical sensors of the two-dimensional grid. For example, photo data captured using the camera 150 may mean one or more pieces of two-dimensional frame data obtained from the camera 150. For example, video data captured using the camera 150 may mean a sequence of a plurality of pieces of two-dimensional frame data obtained from the camera 150 according to a frame rate. The camera 150 may be placed toward the front of the vehicle. By being arranged to face the front of the vehicle, the camera 150 may obtain an image representing the external environment corresponding to the front of the vehicle. The camera 150 may include a black box camera (dash cam) based on obtaining an image representing the external environment. The camera 150 may include a depth camera for identifying the distance between the vehicle and at least one object located around the vehicle (e.g., a depth map). A depth map may be an image (or image channel) that includes information relating to the distance of surfaces of one or more objects from a viewpoint. A depth map may be rendered by obtaining a plurality of images from one or more viewpoints and determining a distance from one or more pixel to one or more image sensors (e.g., cameras). For a depth camera (e.g., an RGB-Depth camera) may comprise a device that captures both color images (RGB) and depth information simultaneously. It may combine the capabilities of a traditional color camera, which may capture the visual appearance of a scene using red, green, and blue channels, with a depth sensor that may measure the distance between the camera and objects in the scene. This dual data capture may enable the camera to create a 3D representation of the environment, making it useful for applications such as 3D modeling, robotics, augmented reality, and/or gesture recognition, etc. RGB-Depth camera may be useful in scenarios where understanding both the color and spatial structure of a scene may be necessary.

The vehicle control apparatus 100, according to an example, may use the camera 150 (e.g., an image obtained/acquired via the camera 150) to identify that the vehicle enters a point in the indoor environment from a point in the external environment (e.g., enters the indoor environment by moving from a first point—the point in the external environment—to a second point—the point in the indoor environment). For example, the vehicle control apparatus 100 may use the camera 150 to identify that the vehicle enters the point in the indoor environment from the point in the external environment, based on (e.g., by) identifying entrance and/or exit information corresponding to the point in the indoor environment.

For example, the entrance and/or exit information may include information about an external object (e.g., a height limit sign indicating the height limit of vehicles that may enter the indoor environment, a blocker for temporarily blocking a vehicle from entering the indoor environment, and/or a speed bump for reducing the speed of the vehicle).

For example, the vehicle control apparatus 100 may use an external environment map 125 to identify that a vehicle enters the indoor environment at a point in the indoor environment from a point in the external environment based on the vehicle located on an external road deviating from the external road. However, the disclosure is not limited thereto.

The vehicle control apparatus 100, according to an example, may identify, based on the vehicle entering a point in the indoor environment, at least one object in the indoor environment by using the camera 150 (e.g., based on an image obtained/acquired by the camera 150).

For example, the vehicle control apparatus 100 may identify at least one object by using image recognition and/or feature detection on an image, representing at least a portion of the indoor environment, obtained using the camera 150.

For example, the vehicle control apparatus 100 may obtain/determine/receive a point cloud for at least one object. The point cloud may represent a set of points located in three-dimensional space. However, the disclosure is not limited thereto. For example, the vehicle control apparatus 100 may use the sensor 130 to obtain a point cloud for at least one object located around the vehicle. For example, the point cloud may include information about at least one object (e.g., location or type). For example, a point cloud may comprise a collection of data points in a three-dimensional coordinate system, representing the external surface of an object or environment. Each point in the cloud may have its own set of X, Y, and Z coordinates, and/or additional information (e.g., color or intensity). Point clouds may be typically generated by 3D scanners, LiDAR, or photogrammetry techniques, and may be used in various applications such as 3D modeling, computer vision, and/or robotics, etc. They may provide a highly detailed and/or accurate representation of complex surfaces and/or structures, making them ideal for tasks like object recognition, environment mapping, and/or digital reconstruction, etc.

For example, the point cloud may include a feature point. The vehicle control apparatus 100 may obtain feature points for at least one object via object recognition in an image obtained using the camera 150.

The vehicle control apparatus 100, according to an example, may generate, based on/by using the point cloud, an indoor environment map representing at least a portion of the indoor environment along a movement path of the vehicle in the indoor environment.

For example, the vehicle control apparatus 100 may generate an indoor environment map based on/via simultaneous localization and mapping (SLAM). The indoor environmental map may be generated based on/via SLAM according to the movement path of the vehicle. For example, the vehicle control apparatus 100 may generate the indoor environment map based on/via execution of a map data generator. However, the disclosure is not limited thereto. The vehicle control apparatus 100 may obtain the indoor environment map by transmitting data obtained based on execution of the parking lot entry determination and time processor and/or the point cloud information generator to an external server including the map data generator.

For example, the vehicle control apparatus 100 may obtain a virtual object representing at least one object from a point cloud based on a mesh. The vehicle control apparatus 100 may generate a 3D-based indoor environment map 127 including a virtual object.

For example, the vehicle control apparatus 100 may obtain a virtual object based on a mesh in order to visually express a point cloud. The virtual object may include color information. The vehicle control apparatus 100 may represent the virtual object in three-dimensional space based on a mesh. For example, a virtual object obtained based on a mesh may include a virtual object having a shape such as a vertex, an edge, and/or a polygon. However, the disclosure is not limited thereto.

After/based on generating the indoor environment map, the vehicle control apparatus 100, according to an example, may temporarily stop acquiring a point cloud based on identifying that the vehicle moves to another point in the external environment (e.g., a third point).

For example, the vehicle control apparatus 100 may identify, based on the GPS signal being received, that the vehicle moves to another point in the external environment. For example, the vehicle control apparatus 100 may identify that the vehicle moves to another point in the external environment by/based on identifying an object (e.g., a barrier or road) representing another point in the external environment by using a camera. However, the disclosure is not limited thereto.

For example, the vehicle control apparatus 100 may identify the start and/or end points of the indoor environment map 127 based on the generating the indoor environment map (e.g., based on the generated indoor environment map). The vehicle control apparatus 100 may use the external environment map 125 to identify the start and end points of the indoor environment map 127.

The vehicle control apparatus 100, according to an example, may use the external environment map 125 representing the external environment to map points of the external environment and/to points of the indoor environment, thereby determining a point of the indoor environment as a start point of the indoor environment map 127.

For example, the vehicle control apparatus 100 may use the external environment map 125 to identify coordinates representing a point in the indoor environment. The vehicle control apparatus 100 may identify the start point of the indoor environment map 127 by using/based on coordinates indicating a point in the indoor environment. As an example, a point in the indoor environment may include a parking lot entrance.

For example, the vehicle control apparatus 100 may determine a point of the indoor environment as the start point of the indoor environment map 127 by matching the coordinates corresponding to the point of the indoor environment with the coordinates corresponding to a point of the external environment. For example, the vehicle control apparatus 100 may map points in the external environment and/to points in the indoor environment based on optimization (e.g., by applying an optimization algorithm to map points in the external environment and to point in the indoor environment). For example, based on optimization, the vehicle control apparatus 100 may combine data representing the indoor environment map 127 with data representing the external environment map 125, thereby correcting/modifying a position in the indoor environment map 127 based on the external environment map 125. However, the disclosure is not limited thereto.

The vehicle control apparatus 100, according to an example, may generate a virtual route including a point of the external environment by using the external environment map 125. For example, the vehicle control apparatus 100 may generate a virtual route based on a route with the shortest distance among a plurality of routes including points in the external environment. However, the disclosure is not limited thereto.

The vehicle control apparatus 100, according to an example, may obtain a closed curve including a virtual route and a movement path of the vehicle based on loop closure (e.g., loop closure detection/a loop closure algorithm).

The vehicle control apparatus 100, according to an example, may determine a point of the indoor environment as the start point of the indoor environment map 127 by/based on correcting the point of the indoor environment with a point of the external environment.

For example, the vehicle control apparatus 100 may determine a point in the indoor environment as the start point of the indoor environment map 127 by matching the coordinates corresponding to the point of the indoor environment with the coordinates corresponding to the indoor environment map 127.

The vehicle control apparatus 100 according to an example may identify that the vehicle moves from another point in the indoor environment to another point in the external environment. For example, the vehicle control apparatus 100 may temporarily stop acquiring a point cloud for at least one object based on identifying that the vehicle moves to another point in the external environment. However, the disclosure is not limited thereto.

The vehicle control apparatus 100, according to an example, may use the external environment map 125 to map another point in the external environment with another point in the indoor environment based on the loop closure.

For example, if a first point in the indoor environment is an entrance of the indoor environment and a second point in the indoor environment is an exit of the indoor environment, the coordinates of the first point in the indoor environment and the coordinates of the second point in the indoor environment may be different.

For example, if a first point in the indoor environment is an entrance/exit, the coordinates of the point in the indoor environment and the coordinates of second point in the indoor environment may be the same. In this case, the vehicle control apparatus 100 may map other points in the indoor environment to points in the indoor environment, points in the external environment, and/or other points in the external environment. However, the disclosure is not limited thereto.

The vehicle control apparatus 100 according to an example may determine another point in the indoor environment as an end point of the indoor environment map by mapping another point in the external environment to another point in the indoor environment.

For example, the vehicle control apparatus 100 may use the external environment map 125 to identify coordinates representing other points in the indoor environment. The vehicle control apparatus 100 may identify the end point of the indoor environment map 127 by using coordinates representing other points in the indoor environment.

For example, the vehicle control apparatus 100 may match coordinates corresponding to another point in the indoor environment with coordinates corresponding to another point in the external environment, thereby determining the another point in the indoor environment as the end point in the indoor environment map 127. For example, the vehicle control apparatus 100 may map, based on optimization, other points in the external environment and other points in the indoor environment. The optimization may include compensating for indoor environment based on external environment.

The vehicle control apparatus 100 according to an example may determine another point in the indoor environment as the end point of the indoor environment map 127 by mapping another point in the external environment and another point in the indoor environment using a closed curve.

For example, the vehicle control apparatus 100 may obtain a closed curve, which includes the movement path of the vehicle and a virtual route, by mapping a point in the indoor environment and a point in the external environment, and mapping another point in the indoor environment and another point in the external environment.

According to an example, the communication circuit 160 of the vehicle control apparatus 100 may include hardware components for supporting transmission and/or reception of electrical signals between the vehicle control apparatus 100 and an external electronic device. For example, the communication circuit 160 may include at least one of a modem, an antenna, and an optical/electronic (O/E) converter. The communication circuit 160 may support transmission and/or reception of electrical signals based on various types of protocols, such as an Ethernet, a local area network (LAN), a wide area network (WAN), a wireless fidelity (Wi-Fi), Bluetooth, Bluetooth low energy (BLE), ZigBee, long term evolution (LTE), or 5G new radio (NR).

The vehicle control apparatus 100 according to an example may receive a GPS signal indicating the location of the vehicle from an external server by using the communication circuit 160. For example, if a vehicle travelling in an external environment enters an indoor environment, reception of GPS signals via the communication circuit 160 may be temporarily interrupted. For example, if reception of a GPS signal indicating the location of the vehicle from an external server is temporarily interrupted and/or if the speed of the vehicle is reduced, the vehicle control apparatus 100 may identify that the vehicle enters (or moves to) a point in the indoor environment from a point in the external environment. However, the disclosure is not limited thereto.

As described above, the vehicle control apparatus 100 according to an example may use the camera 150 to identify that the vehicle moves from the external environment to the indoor environment. The vehicle control apparatus 100 may use the image obtained via the camera 150 to identify that the vehicle moves into the indoor environment based on object recognition or feature detection. The vehicle control apparatus 100 may obtain a point cloud for at least one object identified by using the camera 150 according to the movement path of the vehicle in the indoor environment, based on the movement of the vehicle into the indoor environment. The vehicle control apparatus 100 may generate an indoor environment map representing at least a portion of the indoor environment by using a point cloud. For example, the vehicle control apparatus 100 may correct the position of the indoor environment map by using the external environment map. The vehicle control apparatus 100 may improve the accuracy of the indoor environment map by correcting the position of the indoor environment map based on loop closure. The vehicle control apparatus 100 may reduce the cost of generating the indoor environment map by generating the indoor environment map using a camera.

Figure 2A:
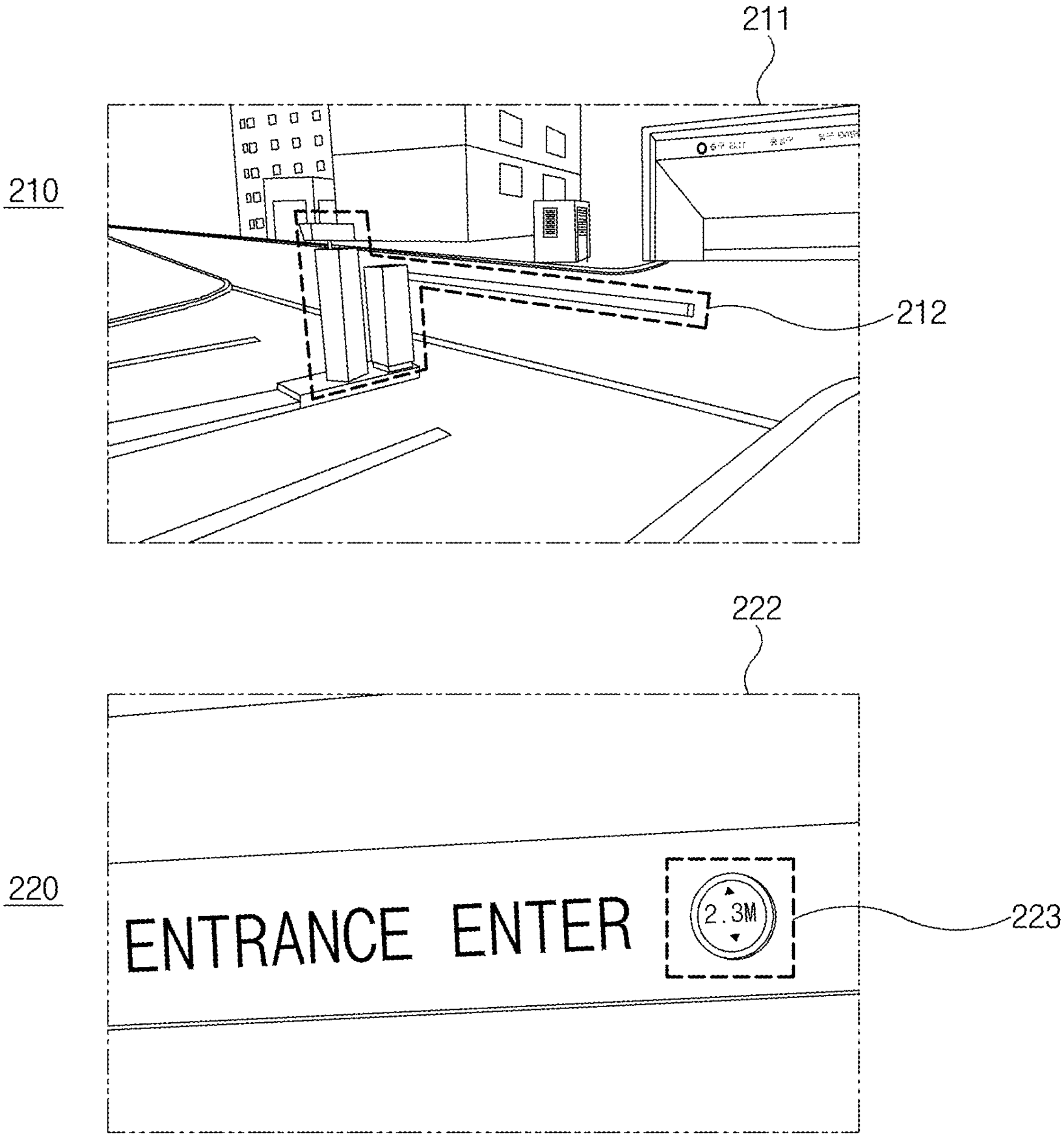
FIGS. 2A and 2B are diagrams illustrating an example of an operation of identifying the location of a vehicle by a vehicle control apparatus according to an example of the present disclosure.
Figure 2B:
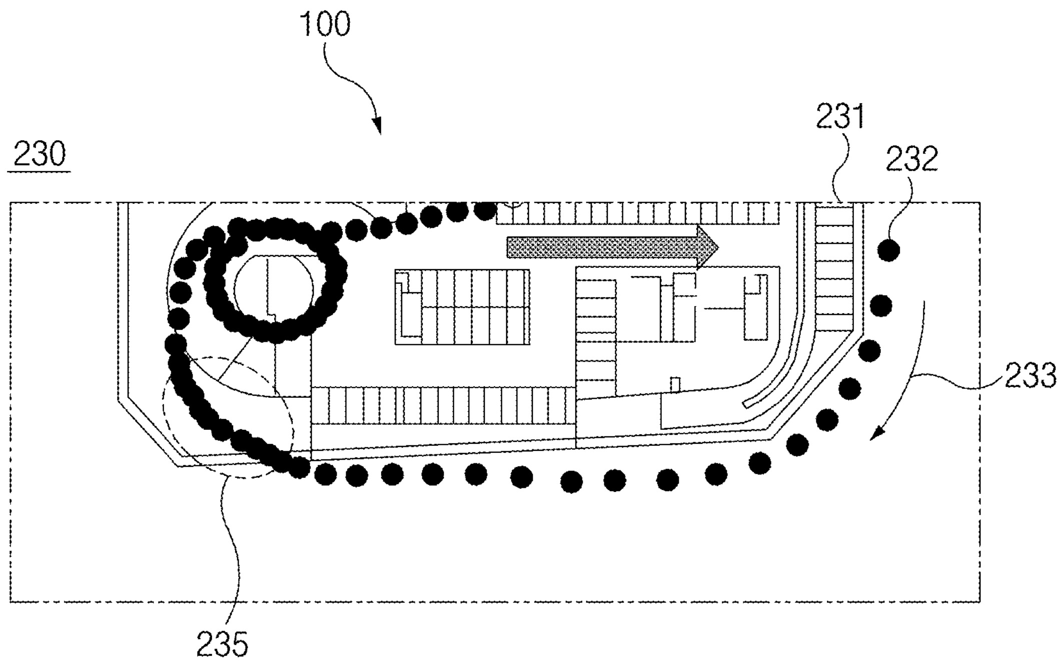

FIGS. 2A and 2B are diagrams illustrating an example of an operation of identifying the location of a vehicle by a vehicle control apparatus according to an example of the present disclosure. The vehicle control apparatus 100 of FIGS. 2A and 2B may be referred to as the vehicle control apparatus 100 of FIG. 1.

Referring to FIG. 2A, while the vehicle travels, the vehicle control apparatus 100 according to an example may use a camera (e.g., the camera 150 in FIG. 1) to obtain an image representing at least a portion of the external environment corresponding to the front of the vehicle. The vehicle control apparatus 100 may identify that the vehicle enters a point in the indoor environment from a point in the external environment based on image recognition (or object recognition) of the image.

In one example 210, the vehicle control apparatus 100 according to an example may obtain an image 211 by using a camera. The vehicle control apparatus 100 may analyze the image 211.

For example, the vehicle control apparatus 100 may identify an external object 212 within the image 211. The external object 212 may include a blocker for temporarily blocking entry of a vehicle. The external object 212 may include a speed bump for reducing the speed of the vehicle. However, the disclosure is not limited thereto.

For example, the vehicle control apparatus 100 may use parking lot information to identify the external object 212 located in front of the entrance of the parking lot. The vehicle control apparatus 100 may predict that a vehicle enters the indoor environment from the external environment by identifying the external object 212. However, the disclosure is not limited thereto.

In one example 220, the vehicle control apparatus 100 according to an example may obtain an image 222 by using a camera. The vehicle control apparatus 100 may identify an external object 223 within the image 222 that indicates a height at which entry into the indoor environment is possible. By identifying the external object 223, the vehicle control apparatus 100 may identify that the vehicle moves from the external environment to the indoor environment.

Referring to FIG. 2B, in one example 230, it is shown that an image 231 includes a visual object 232 indicating the location of a vehicle. The image 231 may represent map information including an external environment map (e.g., the external environment map 125 in FIG. 1) and/or an indoor environment map (e.g., the indoor environment map 127 in FIG. 1).

The vehicle control apparatus 100 according to an example may identify the location of the vehicle over time. The vehicle control apparatus 100 may identify the location of the vehicle based on a GPS signal received from an external server. The vehicle control apparatus 100 may identify the location of the vehicle on an external environment map (e.g., the external environment map 125 in FIG. 1) based on receiving a GPS signal.

For example, the vehicle control apparatus 100 may express the location of the vehicle by using the visual object 232 on an external environment map. The visual object 232 may represent the location of the identified vehicle over time.

For example, the length between a visual object and another visual object may vary depending on the speed of the vehicle. Because the vehicle control apparatus 100 identifies the location of the vehicle based on the same time, as the speed of the vehicle increases, the length between the visual object and another visual object may become longer. For example, because the length between visual objects within an area 235 is relatively short, the vehicle control apparatus 100 may identify a decrease in vehicle speed.

For example, the vehicle control apparatus 100 may identify the location of a moving vehicle based on a direction 233 specified in the external environment. For example, the vehicle control apparatus 100 may identify the location of the vehicle based on the moving direction and/or the speed of the vehicle identified using a sensor (e.g., the sensor 130 in FIG. 1).

The vehicle control apparatus 100 according to an example may receive a GPS signal indicating the location of the vehicle from an external server by using the communication circuit 160 while the vehicle travels in the external environment. For example, if a vehicle travelling in the external environment enters the indoor environment, reception of GPS signals via the communication circuit 160 may be temporarily interrupted.

For example, if reception of a GPS signal indicating the location of the vehicle from an external server is temporarily interrupted, and/or if the speed of the vehicle is reduced, the vehicle control apparatus 100 may identify a vehicle moving from a point in the external environment to a point in the indoor environment.

For example, the vehicle control apparatus 100 may identify the location of the entrance of the indoor environment by using an external environment map. The vehicle control apparatus 100 may identify that the vehicle enters the indoor environment if reception of a GPS signal is temporarily interrupted after the vehicle is located within a specified range from the location of the entrance of the indoor environment.

For example, the vehicle control apparatus 100 may use parking lot information to identify that the vehicle enters the indoor environment if the vehicle travels on a link entering the parking lot. However, the disclosure is not limited thereto. As an example, the vehicle control apparatus 100 may use the location information of the identified vehicle, an external environment map, and/or parking lot information to identify that the vehicle enters the indoor environment, based on execution of the parking lot entry determination and time processor using a sensor As described above, the vehicle control apparatus 100 according to an example may identify that the vehicle moves from the external environment to the indoor environment by using an image obtained from a camera. The vehicle control apparatus 100, according to an example, may identify that the vehicle moves from the external environment to the indoor environment based on reception of the GPS signal being temporarily interrupted and/or the speed of the vehicle being reduced. After the vehicle moves to the indoor environment (e.g. after identifying the vehicle has moved from the external environment to the indoor environment), the vehicle control apparatus 100 may use at least one object identified in an image, of the indoor environment, obtained by the camera 150 to obtain a point cloud for at least one object in the indoor environment to generate a map of the indoor environment. The vehicle control apparatus 100 may generate an indoor environment map representing at least a portion of the indoor environment by using a point cloud. The vehicle control apparatus may generate an indoor environment map based on the image from the camera 150 at a lower cost than generating an indoor environment map using LiDAR, for example.

Figure 3:
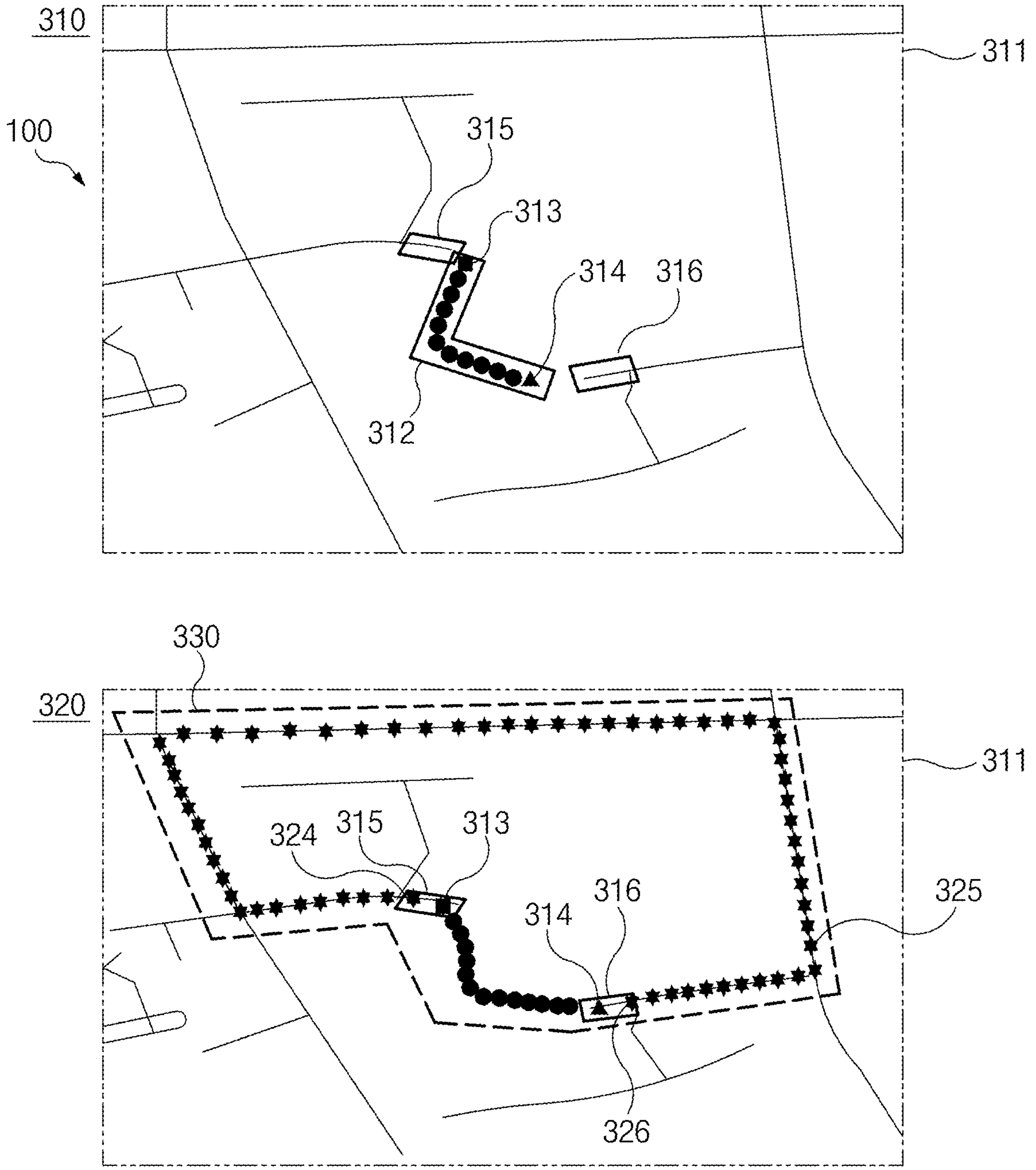
FIG. 3 is a diagram illustrating an example of an operation of correcting an indoor environment map by a vehicle control apparatus according to an example of the present disclosure.

FIG. 3 is a diagram illustrating an example of an operation of correcting an indoor environment map by a vehicle control apparatus according to an example of the present disclosure. The vehicle control apparatus 100 of FIG. 3 may be referenced to the vehicle control apparatus 100 of FIG. 1.

In an example 310, the vehicle control apparatus 100 may map an indoor environment map 312 by using an external environment map 311. The indoor environment map 312 may be included in the indoor environment map 127 in FIG. 1. The external environment map 311 may be included in the external environment map 125 in FIG. 1.

The vehicle control apparatus 100 according to an example may generate the indoor environment map 312 according to the movement path of the vehicle within the indoor environment. The indoor environment map 312 may represent at least a portion of the indoor environment according to the movement path of the vehicle. The indoor environment map 312 may include information about a path along which a vehicle in the indoor environment is movable, information about at least one object included in the indoor environment, and/or information about available parking areas within the indoor environment (e.g., the number of parking spaces for disabled people only). However, the disclosure is not limited thereto.

For example, the external environment map 311 may include information about the location of at least one object included in the external environment.

The vehicle control apparatus 100 according to an example may use the external environment map 311 to identify the location of an entrance 315 for entering the indoor environment and/or an exit 316 for moving from the indoor environment to the external environment.

The vehicle control apparatus 100 according to an example may obtain a point cloud representing at least a portion of the indoor environment to generate the indoor environment map 312 by using a camera, based on the vehicle moving from a point (e.g., parking lot entrance) in the external environment to a point in the indoor environment.

The vehicle control apparatus 100, according to an example, may, based on the vehicle moving from another point in the indoor environment to another point in the external environment, temporarily stop obtaining a point cloud. In other words, the vehicle control apparatus 100 may temporarily stop generating the indoor environment map 312 based on the vehicle moving to another point in the external environment.

In an example, because the GPS signal may be temporarily interrupted (e.g., based on the vehicle moving to a point in the indoor environment), a start point 313 of the indoor environment map 312 generated by the vehicle control apparatus 100 may be different from a point (e.g., an entrance 315) in the external environment. That is, even though the vehicle moves continuously, a drift or jump may occur between the start point 313 of the indoor environment map 312 and a point in the external environment (e.g., the entrance 315) due to loss of the GPS signal). Likewise, even though the vehicle continuously moves from another point in the indoor environment (e.g., an end point 314) to another point in the external environment (e.g., an exit 316), a drift or jump may occur between a second (e.g., end point 314) point in the indoor environment (e.g., end point 314) and a second point in the external environment (e.g., the exit 316).

In an example 320, the vehicle control apparatus 100, according to an example, may correct the start point 313 and/or the end point 314 of the indoor environment map 312 by using (e.g., based on) the external environment map 311.

For example, the operation of correcting the start point 313 and/or the end point 314 of the indoor environment map 312 may include the operation of correcting the start point and/or the end point of the point cloud corresponding to the indoor environment map 312.

For example, before generating the indoor environment map 312 using a point cloud, the vehicle control apparatus 100 may correct the start and end points of the point cloud and then generate the indoor environment map. However, the disclosure is not limited thereto.

The vehicle control apparatus 100, according to an example, may use the external environment map 311 to generate a virtual route 325 including a point (e.g., the entrance 315 or the exit 316) of the external environment.

For example, the virtual route 325 may be generated based on information about a road on which a vehicle is movable in the external environment.

The vehicle control apparatus 100, according to an example, may generate the virtual route 325 based on a route having the shortest distance among a plurality of routes including points in the external environment. However, the disclosure is not limited thereto.

The vehicle control apparatus 100, according to an example, may obtain the virtual route 325 and a closed curve 330, including a movement path of a vehicle in the indoor environment (e.g., from 312 to 314), based on loop closure.

For example, based on the location of the entrance 315, the vehicle control apparatus 100 may map one end 324 of the virtual route 325 (e.g., a point in the external environment) to a point in the indoor environment to determine/identify/generate/select a point of the indoor environment as the start point 313 of the indoor environment map 312.

For example, the vehicle control apparatus 100 may map an opposite end 326 of the virtual route 325 (e.g., a second point in the external environment) and a second point in the indoor environment based on the location of the exit 316 to determine a second point in the indoor environment as the end point 314 of the indoor environment map 312.

The vehicle control apparatus 100, according to an example, may map the indoor environment map 312 with a road in the external environment by using the closed curve 330 obtained based on loop closure. The vehicle control apparatus 100 may use the external environment map 311 to set coordinates where the indoor environment map 312 is located in the external environment.

As described above, the vehicle control apparatus 100, according to an example, may generate the indoor environment map 312 and then use the external environment map 311 to correct the locations of the start point 313 and/or the end point 314 of the indoor environment map 312. The vehicle control apparatus 100 may obtain/generate more accurate map information (e.g., indoor environment map) by correcting the locations of the start point 313 and/or the end point 314 of the indoor environment map 312 using the external environment map 311. By mapping the indoor environment map 312 with a road, the vehicle control apparatus 100 may continuously provide map information to the user, independently of the location of the vehicle (location within the indoor environment or location within the external environment).

Figure 4:
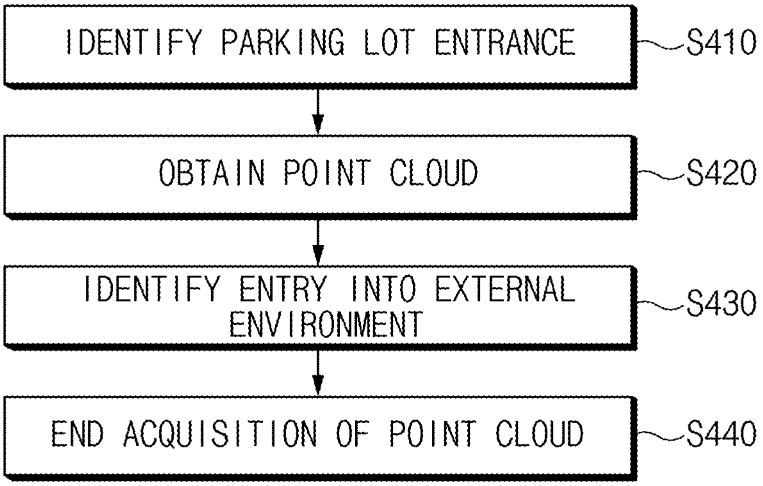
FIG. 4 is a flowchart illustrating an example of an operation of a vehicle control apparatus according to an example of the present disclosure.

FIG. 4 is a flowchart illustrating an example of an operation of a vehicle control apparatus according to an example of the present disclosure. Hereinafter, it is assumed that the vehicle control apparatus 100 of FIG. 1 performs the process of FIG. 4. Also, or alternatively, it may be understood in the description of FIG. 4 that operations described as being performed by an apparatus are controlled by the processor 110 of the vehicle control apparatus 100. Each of the operations in FIG. 4 may be performed sequentially, but is not necessarily performed sequentially. For example, the order of each operation may be changed, and at least two operations may be performed in parallel.

Referring to FIG. 4, in operation S410, the vehicle control apparatus according to an example may identify a parking lot entrance by using a camera.

For example, the vehicle control apparatus may obtain, via a camera, an image representing at least a portion of the external environment corresponding to the front of a vehicle travelling on a road in the external environment.

For example, the vehicle control apparatus may identify at least one object, in an image acquired by the camera 150, based on object recognition.

For example, the vehicle control apparatus may determine whether at least one object recognized in the image is a parking lot access road. The vehicle control apparatus may determine whether the at least one object is a parking lot access road by using parking lot information. However, the disclosure is not limited thereto.

In an example, the vehicle control apparatus may identify that the vehicle moves from the external environment to the indoor environment based on identifying the parking lot access road in the image.

For example, the vehicle control apparatus may identify that a vehicle moves from the external environment to the indoor environment based on a temporary interruption in reception of GPS signals.

For example, the vehicle control apparatus may identify the location of the vehicle off the road while identifying the location of the vehicle within the external environment using an external environment map (e.g., the external environment map 125 in FIG. 1). The vehicle control apparatus may identify that the vehicle moves from the external environment to the indoor environment based on identifying the location of the vehicle off the road. However, the disclosure is not limited thereto.

Referring to FIG. 4, in operation S420, the vehicle control apparatus according to an example may obtain a point cloud. For example, the operation of obtaining a point cloud by the vehicle control apparatus may include an operation of performing point clouding.

For example, the vehicle control apparatus may obtain, via a camera (e.g., the camera 150) based on the vehicle moving into the indoor environment (e.g., based on the movement path of the vehicle indicating the vehicle moved into the indoor environment), an image representing (e.g., of) at least a portion of the indoor environment. The vehicle control apparatus may obtain a point cloud for at least one object in the image (e.g., recognized in the image).

For example, based on obtaining the point cloud, the vehicle control apparatus may generate an indoor environment map representing at least a portion of the indoor environment according to the movement path of the vehicle.

In an example, if the indoor environment includes an indoor parking lot, the vehicle control apparatus may identify ignition off for parking the vehicle. The ignition off may include the operation of the ignition system of a vehicle.

For example, the vehicle control apparatus may identify that the vehicle's ignition is turned on after the vehicle's ignition is turned off. The ignition off may include disengagement of the ignition system of the vehicle.

For example, the vehicle control apparatus may maintain an operation (e.g., operation S420) of obtaining a point cloud independently of the vehicle ignition off or the vehicle ignition on, within the indoor environment. However, the disclosure is not limited thereto.

Referring to FIG. 4, in operation S430, the vehicle control apparatus 100, according to an example, may identify that the vehicle enters the external environment (e.g., from the indoor environment and/or proximate to an indoor environment).

For example, the vehicle control apparatus may identify at least a portion (e.g., a road) of the external environment by using a camera (e.g., the camera 150), so that it is possible to identify that the vehicle moves to the external environment.

For example, the vehicle control apparatus may identify that the vehicle moves to the external environment based on identifying the GPS signal.

Referring to FIG. 4, in operation S440, the vehicle control apparatus according to an example may end (or stop) acquisition of the point cloud.

For example, the vehicle control apparatus may correct the indoor environment map generated using the point cloud based on the completion of acquisition of the point cloud.

For example, the vehicle control apparatus may use the external environment map to determine where the indoor environment map is to be placed within the external environment.

As described above, the vehicle control apparatus according to an example may provide a more accurate indoor environment map to the user by determining the location of the indoor environment map.

Figure 5:
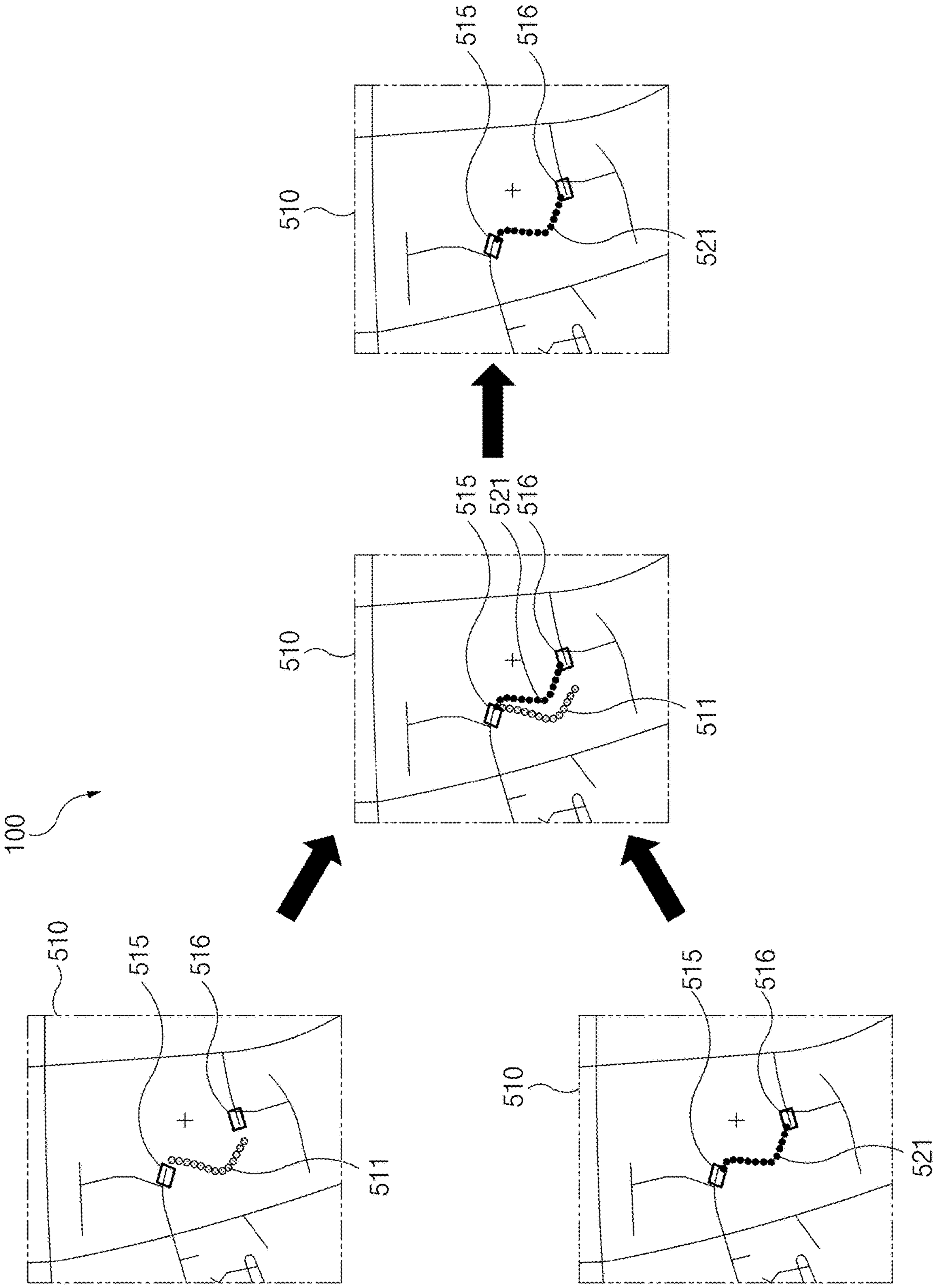
FIG. 5 is a diagram illustrating an example of an operation of selecting at least one indoor environment map from a plurality of indoor environment maps a vehicle control apparatus according to an example of the present disclosure.

FIG. 5 is a diagram illustrating an example of an operation of selecting at least one indoor environment map from a plurality of indoor environment maps by a vehicle control apparatus according to an example of the present disclosure. Referring to FIG. 5, the vehicle control apparatus 100 of FIG. 5 may be referred to as the vehicle control apparatus 100 of FIG. 1. The vehicle control apparatus 100 of FIG. 5 may be implemented outside the vehicle. The vehicle control apparatus 100 of FIG. 5 may be referred to as a server if and/or remote control if implemented outside the vehicle.

The vehicle control apparatus 100, according to an example, may receive (e.g., from one or more vehicles) information about a point cloud corresponding to each of athe plurality of vehicles.

For example, the vehicle control apparatus 100 may obtain (e.g., from a first vehicle and/or another computing device associated with the first vehicle) a first point cloud 511 obtained according to the movement path of the first vehicle in an indoor environment.

For example, the vehicle control apparatus 100 may obtain (e.g., from a second vehicle and/or another computing device associated with the second vehicle) a second point cloud 521 obtained according to the movement path of the second vehicle in the indoor environment.

The first point cloud 511 and the second point cloud 521 may be different from each other (e.g., due to the movement path of a vehicle, vehicle sensor information (e.g., IMU sensor information, a cloud obtaining time point, and a point cloud obtaining time point).

Based on obtaining the first point cloud 511 and the second point cloud 521, the vehicle control apparatus 100, according to an example, may use an external environment map 510 to generate an indoor environment map by using at least one of the first point cloud 511 and/or the second point cloud 521.

For example, the vehicle control apparatus 100 may use the external environment map 510 to identify the locations of an entrance 515 and an exit 516 of the indoor environment.

For example, the vehicle control apparatus 100 may identify the location information of the first point cloud 511 and the location information of the second point cloud 521.

For example, the vehicle control apparatus 100 may use the location information of the first point cloud 511 and/or the location information of the second point cloud 521 to identify at least one point cloud that is relatively adjacent to (best fits and/or is closest to) the entrance 515 and/or the exit 516 of the indoor environment.

For example, if the start point (or end point) corresponding to the second point cloud 521 is closer to the entrance 515 than the start point corresponding to the first point cloud 511, the vehicle control apparatus 100 may generate an indoor environment map by generating a closed circuit using the second point cloud 521.

In an example, because point clouds representing different parts of the indoor environment are obtained according to the movement path of the vehicle, the vehicle control apparatus 100 may use the first point cloud 511 and the second point cloud 521 to generate an indoor environment map (e.g., use some portion of the first point cloud 511 and another portion of the second point cloud 521).

For example, if the first point cloud 511 represents a portion of the indoor environment and the second point cloud 521 represents another portion (or the remaining portion excluding the portion) of the indoor environment, the vehicle control apparatus 100 may generate an indoor environment map representing the entire indoor environment by using the first point cloud 511 and the second point cloud 521. However, the disclosure is not limited thereto.

The vehicle control apparatus 100 according to an example may use a point cloud to determine an order for recognizing information about at least one object included in the point cloud.

For example, if at least one object included in the first point cloud 511 is identified using the second point cloud 521, the vehicle control apparatus 100 may prioritize processing of the operations for recognizing information about at least one object. However, the disclosure is not limited thereto.

As described above, the vehicle control apparatus 100 according to an example may obtain point clouds representing at least a portion of the indoor environment from the plurality of vehicles, and may select at least one point cloud adjacent to the location of an exit or an entrance of the external environment from among the obtained point clouds, and may generate an indoor environment map by using at least one selected point cloud. The vehicle control apparatus 100 may improve the accuracy of the indoor environment map by receiving point clouds containing information about different indoor environments from the plurality of vehicles.

Figure 6:
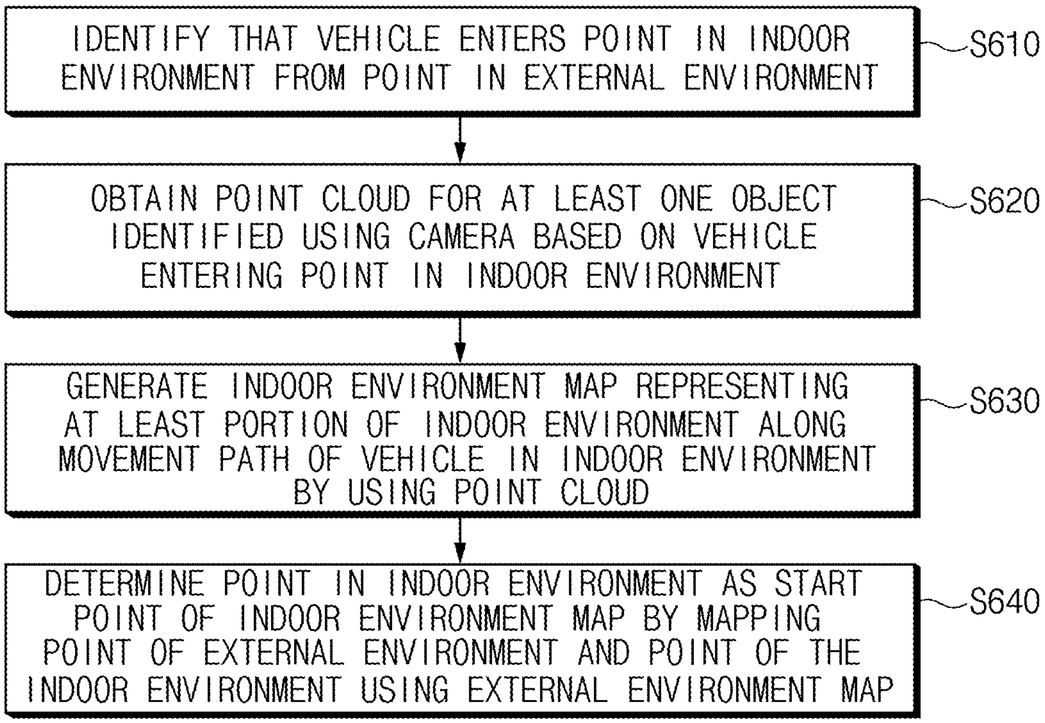
FIG. 6 is a flowchart illustrating a method of controlling a vehicle according to an example of the present disclosure.

FIG. 6 is a flowchart illustrating a method of controlling a vehicle according to an example of the present disclosure.

Hereinafter, a method of controlling a vehicle according to another example of the present disclosure will be described in detail with reference to FIG. 6. FIG. 6 is a flowchart illustrating a method of controlling a vehicle according to another example of the present disclosure.

Hereinafter, it is assumed that the vehicle control apparatus 100 of FIG. 1 performs the process of FIG. 6. Also, or alternatively, it may be understood in the description of FIG. 6 that operations described as being performed by an apparatus are controlled by the processor 110 of the vehicle control apparatus 100. Each of the operations in FIG. 6 may be performed sequentially, but is not necessarily performed sequentially. For example, the order of each operation may be changed, and at least two operations may be performed in parallel.

Referring to FIG. 6, in operation S610, a method of controlling a vehicle, according to an example, may include an operation of identifying that the vehicle enters a point in the indoor environment from a point in the external environment (e.g., enters the indoor environment by moving from a first point in the external environment to a first point in the indoor environment).

For example, a method of controlling a vehicle may include an operation of identifying that a vehicle enters a point in the indoor environment from a point in the external environment by identifying entrance and/or exit information corresponding to the point in the indoor environment by using a camera.

For example, a method of controlling a vehicle may include an operation of identifying that a vehicle enters a point in the indoor environment from a point in the external environment if reception of a GPS signal via a communication circuit is temporarily interrupted.

For example, points in the external environment and/or points in the indoor environment may be included in an area containing an entrance for entering the indoor environment.

Referring to FIG. 6, in operation S620, the method of controlling a vehicle, according to an example, may include an operation of obtaining a point cloud for at least one object identified using a camera (e.g., in an image obtained/acquired by the camera).

For example, a method of controlling a vehicle may include an operation of obtaining an image representing at least a portion of the indoor environment according to the movement path of the vehicle using a camera after the vehicle enters the indoor environment.

For example, a method of controlling a vehicle may include an operation of identifying at least one object based on object recognition in an image.

For example, a method of controlling a vehicle may include an operation of obtaining a point cloud containing information about at least one object.

Referring to FIG. 6, in operation S630, a method of controlling a vehicle according to an example may include an operation of generating an indoor environment map representing at least a portion of the indoor environment along the movement path of the vehicle in the indoor environment by using the point cloud.

For example, a method of controlling a vehicle may include an operation of obtaining (e.g., generating/receiving data indicating), based on a mesh applied to the point cloud, a virtual object representing at least one object from the point cloud. The method of controlling a vehicle may include an operation of generating a 3D-based indoor environment map including the virtual object.

Referring to FIG. 6, in operation S640, the method of controlling a vehicle, according to an example, may include an operation of determining a point in the indoor environment as a start point of the indoor environment map. The point in the indoor environment may be determined to be the start point by mapping, using the external environment map representing the external environment, a point of the external environment to a point of the indoor environment.

For example, the method of controlling a vehicle may include an operation of generating a virtual route based on the shortest path among a plurality of paths including points of the external environment by using an external environment map.

For example, the method of controlling a vehicle may map a point in the external environment and a point in the indoor environment by generating a closed circuit using the trajectory (or the movement path of the vehicle) of the point cloud and the virtual route identified according to the movement path of the vehicle in the indoor environment.

For example, mapped points of the external environment and points of the indoor environment may be included in an area that includes an entrance of the indoor environment.

In an example, the method of controlling a vehicle may improve the accuracy of an indoor environment map by correcting at least a portion of the indoor environment map using the external environment map (e.g., using corresponding points in the external environment map).

Figure 7:
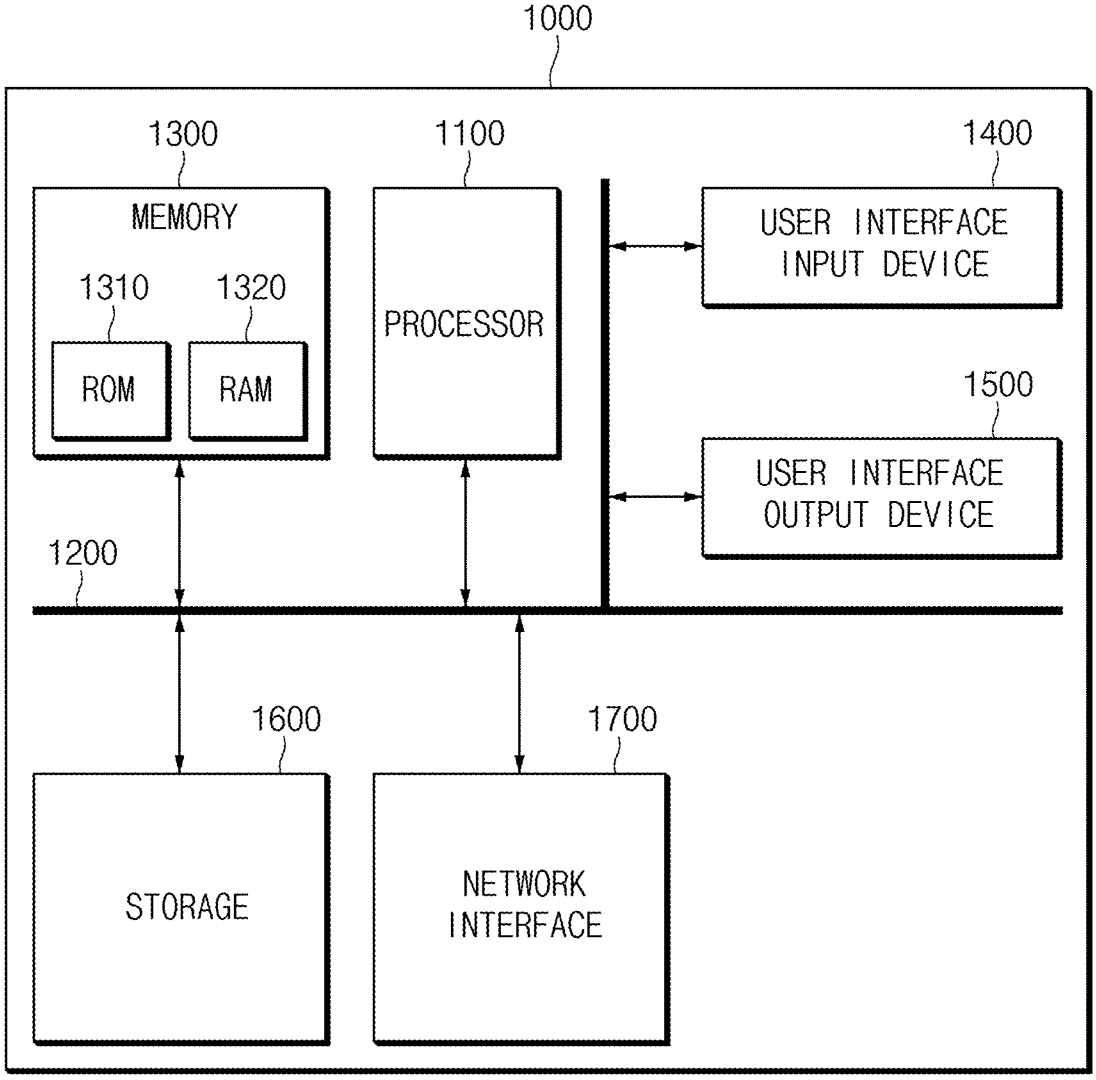
FIG. 7 is a block diagram illustrating a computing system related to the vehicle control apparatus or a method of controlling a vehicle according to an example of the present disclosure.

FIG. 7 is a block diagram illustrating a computing system related to the vehicle control apparatus 100 or a method of controlling a vehicle according to an example of the present disclosure.

Referring to FIG. 7, The computing system 1000 may include at least one processor 1100, a memory 1300, a user interface input device 1400, a user interface output device 1500, storage 1600, and a network interface 1700 connected via a system bus 1200.

The processor 1100 may be a central processing device (CPU) or a semiconductor device that processes instructions stored in the memory 1300 and/or the storage 1600.

The memory 1300 and the storage 1600 may include various types of volatile or non-volatile storage media. For example, the memory 1300 may include a ROM (Read Only Memory) 1310 and a RAM (Random Access Memory) 1320.

Thus, the operations of the method or the algorithm described in connection with the examples disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM.

The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

The present disclosure has been made to solve the above-mentioned problems occurring in the prior art while advantages achieved by the prior art are maintained intact.

An aspect of the present disclosure provides an apparatus for controlling a vehicle capable of identifying whether the vehicle enters an indoor environment and a method thereof.

Another aspect of the present disclosure provides an apparatus for controlling a vehicle capable of performing point clouding by using a camera if the vehicle moves into an indoor environment, and a method thereof.

Still another aspect of the present disclosure provides an apparatus for controlling a vehicle capable of correcting an indoor environment map by using the location of an entrance, and a method thereof.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for controlling a vehicle includes a camera, a processor, and a memory. The processor may identify that the vehicle enters a point in an indoor environment from a point in an external environment, obtain a point cloud for at least one object identified using the camera based on the vehicle entering the point in the indoor environment, generate an indoor environment map representing at least a portion of the indoor environment along a movement path of the vehicle in the indoor environment by using the point cloud, and determine the point in the indoor environment as a start point of the indoor environment map by mapping the point of the external environment and the point of the indoor environment using an external environment map representing the external environment.

According to an example, the processor may generate a virtual route including the point in the external environment by using the external environment map, obtain a closed curve including the virtual route and the movement path based on loop closure, and determine the point in the indoor environment as the start point of the indoor environment map by mapping the point in the external environment and the point in the indoor environment using the obtained closed curve.

According to an example, the processor may generate the virtual route based on a route having a shortest distance among a plurality of routes including the point in the external environment.

According to an example, the processor may identify that the vehicle moves from another point in the indoor environment to another point in the external environment, and determine the another point in the indoor environment as an end point of the indoor environment map by mapping the another point in the external environment and the another point in the indoor environment based on loop closure by using the external environment map.

According to an example, the processor may temporarily stop obtaining the point cloud based on identifying that the vehicle moves to the another point in the external environment.

According to an example, 6 the processor may identify that the vehicle enters the point in the indoor environment from the point in the external environment based on identifying entrance and exit information corresponding to the point in the indoor environment by using the camera.

According to an example, the entrance and exit information may include information about at least one of an external object indicating a height of a vehicle capable of entering the indoor environment, an external object for temporarily blocking entry into the indoor environment, or a combination thereof.

According to an example, the processor may identify that the vehicle enters the point in the indoor environment if reception of a global positioning system (GPS) signal indicating a location of the vehicle from an external server is temporarily interrupted, or if a speed of the vehicle is reduced.

According to an example, the apparatus may further include a sensor. The processor may identify the movement path of the vehicle in the indoor environment by using the sensor after the vehicle enters the point in the indoor environment, and generate the indoor environment map based on simultaneous localization and mapping (SLAM) according to the movement path of the vehicle.

According to an example, the processor may obtain a virtual object representing the at least one object from the point cloud, and generate the indoor environment map including the virtual object and based on three dimensions.

According to another aspect of the present disclosure, a method of controlling a vehicle includes identifying that the vehicle enters a point in an indoor environment from a point in an external environment, obtaining a point cloud for at least one object identified using a camera based on the vehicle entering the point in the indoor environment, generating an indoor environment map representing at least a portion of the indoor environment along a movement path of the vehicle in the indoor environment by using the point cloud, and determining the point in the indoor environment as a start point of the indoor environment map by mapping the point of the external environment and the point of the indoor environment using an external environment map representing the external environment.

According to an example, the determining of the point in the indoor environment may include generating a virtual route including the point in the external environment by using the external environment map, obtaining a closed curve including the virtual route and the movement path based on loop closure, and determining a point in the indoor environment as a start point of the indoor environment map by mapping points in the external environment and points in the indoor environment using the obtained closed curve.

According to an example, the generating of the virtual route may include generating the virtual route based on a route having a shortest distance among a plurality of routes including the point in the external environment.

According to an example, the method may further include identifying that the vehicle moves from another point in the indoor environment to another point in the external environment, and determining the another point in the indoor environment as an end point of the indoor environment map by mapping the another point in the external environment and the another point in the indoor environment based on loop closure by using the external environment map.

According to an example, the identifying of the vehicle movement may include temporarily stopping obtaining the point cloud based on identifying that the vehicle moves to the another point in the external environment.

According to an example, the identifying of the entry of the vehicle into the point of the indoor environment may include identifying that the vehicle enters the point in the indoor environment from the point in the external environment based on identifying entrance and exit information corresponding to the point in the indoor environment by using the camera.

According to an example, the entrance and exit information may include information about at least one of an external object indicating a height of a vehicle capable of entering the indoor environment, an external object for temporarily blocking entry into the indoor environment, or a combination thereof.

According to an example, the identifying of the entry of the vehicle into the point of the indoor environment may include identifying that the vehicle enters the point in the indoor environment if reception of a global positioning system (GPS) signal indicating a location of the vehicle from an external server is temporarily interrupted, or if a speed of the vehicle is reduced.

According to an example, the method may further include identifying the movement path of the vehicle in the indoor environment by using the sensor after the vehicle enters the point in the indoor environment, and generating the indoor environment map based on simultaneous localization and mapping (SLAM) according to the movement path of the vehicle.

According to an example, the generating of the indoor environment map may include obtaining a virtual object representing the at least one object from the point cloud, and generating the indoor environment map including the virtual object and based on three dimensions.

The present technology may determine whether a vehicle enters an indoor environment.

The present technology may perform point clouding by using a camera if a vehicle moves to an indoor environment.

Also, or alternatively, the present technology may correct an indoor environment map by using the location of an entrance.

Also, or alternatively, various effects that are directly or indirectly understood from the present disclosure may be provided.

Although examples of the present disclosure have been described for illustrative purposes, those skilled in the art will appreciate that various modifications, additions and substitutions are possible, without departing from the scope and spirit of the disclosure.

Therefore, the examples disclosed in the present disclosure are provided for the sake of descriptions, not limiting the technical concepts of the present disclosure, and it should be understood that such examples are not intended to limit the scope of the technical concepts of the present disclosure. The protection scope of the present disclosure should be understood by the claims below, and all the technical concepts within the equivalent scopes should be interpreted to be within the scope of the right of the present disclosure.

What is claimed is:

1. An apparatus of a vehicle, the apparatus comprising:
a camera;
one or more processors; and
a memory storing instructions that, when executed by the one or more processors, are configured to cause the apparatus to:
identify that the vehicle moves from a first point in an external environment to a first point in an indoor environment;
based on the vehicle moving to the first point in the indoor environment, obtain a point cloud for at least one object identified in an image acquired using the camera;
generate, based on the point cloud, an indoor environment map representing at least a portion of the indoor environment along a movement path of the vehicle;
map, based on an external environment map representing the external environment, the first point in the external environment to the first point in the indoor environment;
determine, based on the map of the first point in the external environment to the first point in the indoor environment, the first point in the indoor environment as a start point of the indoor environment map; and
control, based on the generated indoor environment map, driving operation of the vehicle,
wherein the instructions, when executed by the one or more processors, are configured to cause the apparatus to:
by using the external environment map, identify that the vehicle enters the indoor environment at a point in the indoor environment from a point in the external environment based on the vehicle located on an external road deviating from the external road.

2. The apparatus of claim 1, wherein the instructions, when executed by the one or more processors, are further configured to cause the apparatus to:
generate, based on the external environment map, a virtual route comprising the first point in the external environment; and
obtain, based on loop closure, a closed curve comprising the virtual route and the movement path,
wherein the instructions, when executed by the one or more processors, are configured to cause the apparatus to map the first point in the external environment to the first point in the indoor environment using the obtained closed curve, and
wherein the closed curve is configured to be obtained by mapping the first point in the external environment to the first point in the indoor environment and mapping a second point in the external environment to a second point in the indoor environment.

3. The apparatus of claim 2, wherein the instructions, when executed by the one or more processors, are configured to cause the apparatus to generate the virtual route based on a route having a shortest distance among a plurality of routes comprising the first point in the external environment.

4. The apparatus of claim 1, wherein the instructions, when executed by the one or more processors, are further configured to cause the apparatus to:
identify that the vehicle moves from a second point in the indoor environment to a second point in the external environment, wherein the second point in the indoor environment corresponds to an exit of the indoor environment;
map, based on loop closure using the external environment map, the second point in the external environment to the second point in the indoor environment; and
determine, based on mapping of the second point in the external environment to the second point in the indoor environment, the second point in the indoor environment as an end point of the indoor environment map.

5. The apparatus of claim 4, wherein the instructions, when executed by the one or more processors, are configured to cause the apparatus to, based on identifying that the vehicle moves to the second point in the external environment, temporarily stop obtaining the point cloud.

6. The apparatus of claim 1, wherein the instructions, when executed by the one or more processors, are configured to cause the apparatus to identify that the vehicle moves from the first point in the external environment to the first point in the indoor environment based on identifying, in the image acquired using the camera, entrance information or exit information corresponding to the first point in the indoor environment by using the camera.

7. The apparatus of claim 6, wherein the entrance information or the exit information comprises information about an external object indicating one or more of:
a height limit for vehicles entering the indoor environment; or
an object for temporarily blocking entry into the indoor environment.

8. The apparatus of claim 1, wherein the instructions, when executed by the one or more processors, are configured to cause the apparatus to identify that the vehicle moves from the first point in the external environment to the first point in the indoor environment based on one or more of:
an interruption of reception of a global positioning system (GPS) signal indicating a location of the vehicle, or
a speed of the vehicle being reduced.

9. The apparatus of claim 1, further comprising:
a sensor,
wherein the instructions, when executed by the one or more processors, are further configured to cause the apparatus to:
identify, based on data acquired by the sensor after the vehicle moves to the first point in the indoor environment, the movement path of the vehicle in the indoor environment; and
generate, based on simultaneous localization and mapping (SLAM) according to the movement path of the vehicle, the indoor environment map.

10. The apparatus of claim 1, wherein the instructions, when executed by the one or more processors, are further configured to cause the apparatus to:
obtain a virtual object representing the at least one object from the point cloud; and
generate the indoor environment map to comprise the virtual object in three dimensions.

11. A method comprising:
identifying that a vehicle moves from a first point in an external environment to a first point in an indoor environment, wherein the identifying comprises by using an external environment map representing the external environment, identifying that the vehicle enters the indoor environment at a point in the indoor environment from a point in the external environment based on the vehicle located on an external road deviating from the external road;
based on the vehicle moving to the first point in the indoor environment, obtaining a point cloud for at least one object identified in an image acquired using a camera;
generating, based on the point cloud, an indoor environment map representing at least a portion of the indoor environment along a movement path of the vehicle
mapping, based on the external environment map, the first point in the external environment to the first point in the indoor environment;
determining, based on the mapping of the first point in the external environment to the first point in the indoor environment, the first point in the indoor environment as a start point of the indoor environment map; and
controlling, based on the generated indoor environment map, driving operation of the vehicle.

12. The method of claim 11, further comprising:
generating, based on the external environment map, a virtual route comprising the first point in the external environment; and
obtaining, based on loop closure, a closed curve comprising the virtual route and the movement path,
wherein the mapping the first point in the external environment to the first point in the indoor environment is based on the obtained closed curve, and
wherein the closed curve is configured to be obtained by mapping the first point in the external environment to the first point in the indoor environment and mapping a second point in the external environment to a second point in the indoor environment.

13. The method of claim 12, wherein the generating of the virtual route is based on a route having a shortest distance among a plurality of routes comprising the first point in the external environment.

14. The method of claim 11, further comprising:
identifying that the vehicle moves from a second point in the indoor environment to a second point in the external environment, wherein the second point in the indoor environment corresponds to an exit of the indoor environment;
mapping, based on loop closure using the external environment map, the second point in the external environment to the second point in the indoor environment; and
determining, based on the mapping, the second point in the indoor environment as an end point of the indoor environment map.

15. The method of claim 14, further comprising, based on the identifying that the vehicle moves to the second point in the external environment, temporarily stopping obtaining the point cloud.

16. The method of claim 11, wherein the identifying that the vehicle moves from the first point in the external environment to the first point in the indoor environment is based on identifying, in the image acquired using the camera, entrance information or exit information corresponding to the first point in the indoor environment.

17. The method of claim 16, wherein the entrance information or the exit information comprises information about an external object indicating one or more of:
a height limit for vehicles entering the indoor environment, or
an object for temporarily blocking entry into the indoor environment.

18. The method of claim 11, wherein the identifying that the vehicle moves from the first point in the external environment to the first point in the indoor environment is based on one or more of:
interruption of reception of a global positioning system (GPS) signal indicating a location of the vehicle; or
a speed of the vehicle being reduced.

19. The method of claim 11, further comprising:
identifying, based on data acquired by a sensor after the vehicle moves into the first point in the indoor environment, the movement path of the vehicle in the indoor environment; and
generating, based on simultaneous localization and mapping (SLAM) according to the movement path of the vehicle, the indoor environment map.

20. The method of claim 11, wherein the generating of the indoor environment map comprises:
obtaining a virtual object representing the at least one object from the point cloud; and
generating the indoor environment map comprising the virtual object in three dimensions.

* * * * *